United States Patent [19]

Boyd et al.

[11] 3,745,361

[45] July 10, 1973

[54] COMPOSITE CLOCK SIGNAL GENERATING AND DISTRIBUTING CIRCUITS

[75] Inventors: Kenneth Williamson Boyd, Edison; Burton R. Saltzberg, Middletown; Herbert Mortimer Zydney, Rumson, all of N.J.

[73] Assignee: Bell Telephone Laboratories, Incorporated, Murray Hill, N.J.

[22] Filed: June 27, 1972

[21] Appl. No.: 266,686

[52] U.S. Cl. ...................... 307/3, 340/310, 328/179, 328/72

[51] Int. Cl. ............................................. H02j 3/02

[58] Field of Search ...................... 307/3, 106, 220, 307/222, 224, 225, 18, 27; 340/310, 150, 167, 170; 178/69.5; 328/179, 72

[56] References Cited

UNITED STATES PATENTS 3,151,915 10/1964 Graybeal ................................ 307/3

*Primary Examiner*—Herman J. Hohauser
*Attorney*—W. L. Keefauver

[57] ABSTRACT

A 64 kHz clock signal is converted to a pulse train, an 8 kHz clock signal is superimposed thereon, and the composite signal is distributed by a balanced floating pair of line leads to terminator circuits located throughout a synchronous central office. The composite signal format comprises alternating polarity pulses having a violation each eighth pulse in that the pulse has the same polarity as the preceding pulse. Successive pulse violations alternate in polarity whereby the pulse train has the advantages of having no dc component and being polarity insensitive, the latter advantage permitting the terminator circuits to recover the clock signals even though the connection of the leads of the line be reversed.

8 Claims, 3 Drawing Figures

Patented July 10, 1973 3,745,361

3 Sheets-Sheet 1

COMPOSITE CLOCK SIGNAL GENERATING AND DISTRIBUTING CIRCUITS

FIELD OF THE INVENTION

This invention relates to clock signal generating and distributing systems and, more particularly, to systems for generating clock signals and distributing them to a plurality of physically separated locations.

DESCRIPTION OF THE PRIOR ART

The function of clock signals is to define instants in time of operations of devices, especially electronic devices. In some applications, different devices operate at the same instant in time; that is, in synchronism; and some devices operate at instants separated by fixed intervals. One such application is a multichannel time-division transmission system wherein groups of transmission channels time share time-division transmission paths, each channel being "assigned" to one of the paths and being allocated a time slot in a repetitive time frame or cycle. The channel "gates" signals onto its assigned path (or obtains signals from the path) during its time slot which is separated by fixed time intervals from the time slots of other channels assigned to the same path. In addition, the time frames of the several paths are in synchronism and each time slot on each path occurs simultaneously with corresponding time slots on other paths. The enabling of these channel gates is conveniently provided by clock signals.

Identification of the instant of time of any time slot is provided by two trains of clock pulses. Each pulse in one train is aligned in time with each time slot in the time frame. Each pulse in the other train is aligned in time with the initial portion of each time frame. A channel, knowing the number of its time slot, counts the time slot clock pulses, starting with the time slot clock pulse occurring after (or concurrently with) the time frame clock pulse until its own number is reached and thereupon enables its channel gate.

The various time-division paths are terminated and are often interconnected in central offices. Since the time frames of the several paths in the office are in synchronism, the clocking signals are advantageously produced by a common source and distributed throughout the office. In a large office, however, the various circuits to be synchronized are physically separated by large distances. The long distribution lines tend to degrade the clock pulse trains. Furthermore, it is advantageous to utilize ac coupled distribution lines and the clocking signals are subjected to dc drift.

It is known, in pulse transmission systems, to convert a pulse train to a bipolar code train, wherein successive pulses have opposing polarities, and apply the converted train to a balanced and floating line consisting of a pair of leads. The utilization of bipolar pulses provides sufficient power to overcome degradation over the distances involved in large offices and dc drift is substantially eliminated since successive pulses are of opposite polarity. This bipolar signaling scheme also has an inherent advantage of being polarity insensitive. The connection of the terminal ends of the leads may be reversed without inverting the pulse train.

It is conventional, when using the bipolar signaling format, to provide a lead pair for each individual pulse train. When other signaling formats are used in synchronizing systems, it is known that one of the distribution lines may be eliminated by superimposing one clock train on the other clock train, the composite signal pulses identifying the clock signals in one train having a characteristic differing from the pulses identifying the signals in the other clock train so that each one of the original trains can be recognized by terminator circuits.

It is an object of this invention to superimpose two clock trains using a bipolar format, wherein the pulses in the composite train have characteristics which permit terminator circuits to identify each of the original trains.

It is also an object of this invention to provide a clock pulse generating and distributing system wherein two clock trains are transmitted over a single transmission pair, the composite signal having no dc component and being polarity insensitive.

SUMMARY OF THE INVENTION

In accordance with the objectives of this invention, a first clock signal is converted to a train of pulses, successive pulses having opposite polarity, and a second clock signal is superimposed thereon by violating the bipolar format to produce pulses having the same polarity as the preceding pulse, the pulse violations thereby produced defining the repetition rate of the second clock signal. The repetition rate of the second clock signal is arranged to be an even submultiple of the first clock signal repetition rate whereby successive pulse violations are of alternate polarity. This latter feature insures that the composite bipolar wave has no dc component and is polarity insensitive.

The composite signal train is advantageously applied across a balanced, floating pair of transmission leads which distributes the signal train to pulse-responsive terminator circuits. Each of the terminator circuits includes circuitry responsive to the bipolar pulses across the leads for recovering the first clock signal and circuitry responsive to each pulse applied across the leads having the same polarity as the preceding pulse for identifying the second clock signal.

In accordance with the illustrative embodiment of this invention, described hereinafter, the circuitry for converting the clock signals to the composite train and applying the composite train across the distribution line includes a pair of pulse generators whose outputs are transformer-coupled, in opposition, to the distribution line and whose inputs are individually connected to gates, each gate being arranged, when enabled, to pass a pulse of the first train therethrough to operate the pulse generator connected thereto. The two gates are normally alternately enabled by the first train of pulses. However, the second clock signal periodically maintains enabled the concurrently enabled gate for an additional pulse period whereby two successive pulses of the first train operate the same pulse generator.

The foregoing and other objects and features of this invention will be more fully understood from the following description of an illustrative embodiment thereof taken in conjunction with the accompanying drawings.

DETAILED DESCRIPTION

Figure 1:
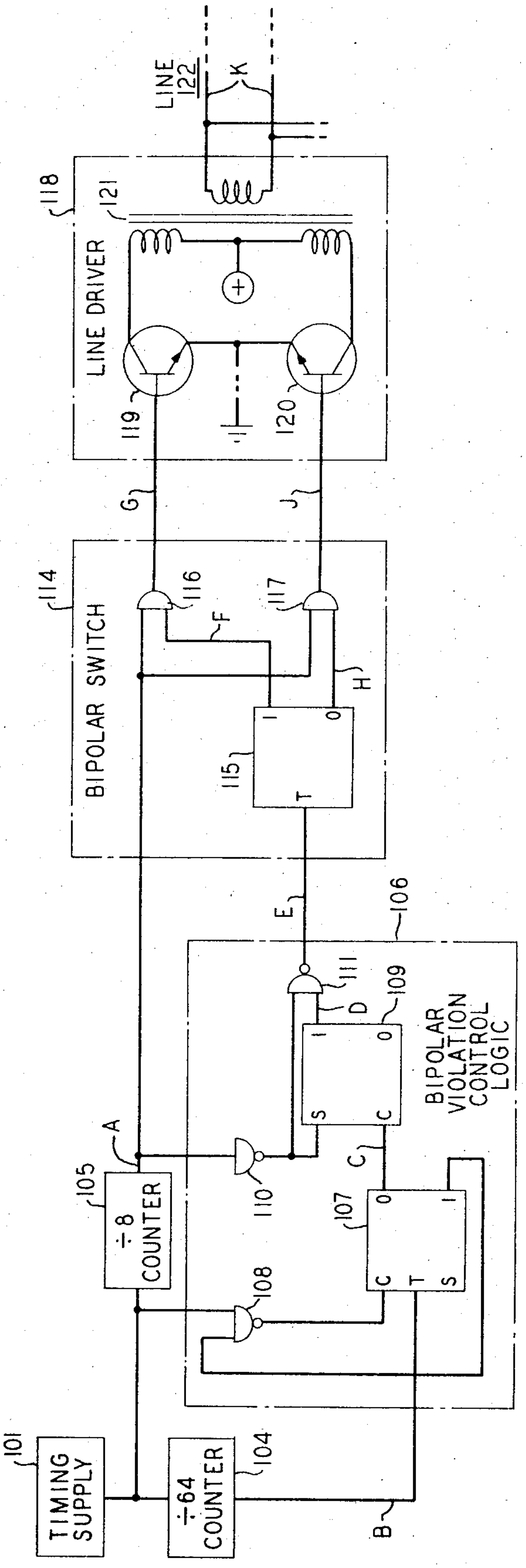
FIG. 1 and FIG. 2, when arranged side by side, disclose, in schematic form, the various circuits which form a composite clock signal generating circuit and a terminator circuit, respectively, in accordance with this invention.

The circuitry for providing the two clock waves and for superimposing one wave on the other one is shown in FIG. 1. The basic timing supply for the circuit is derived from timing supply 101. Timing supply 101 generates a timing wave which, in this specific embodiment, comprises a 512 kHz (kilohertz) wave. This 512 kHz wave is applied to "divide by 8" counter 105, "divide by 64" counter 104, and to one input of bipolar violation control logic 106.

The "divide by 8" counter 105, in response to the 512 kHz wave, generates a 64 kHz rectangular wave. This 64 kHz rectangular wave comprises one of the clock signals and is depicted as signal wave A in FIG. 3. The 64 kHz rectangular wave is applied to a second input of bipolar violation control logic 106 and is also applied to an input of bipolar switch 114.

Figure 3:
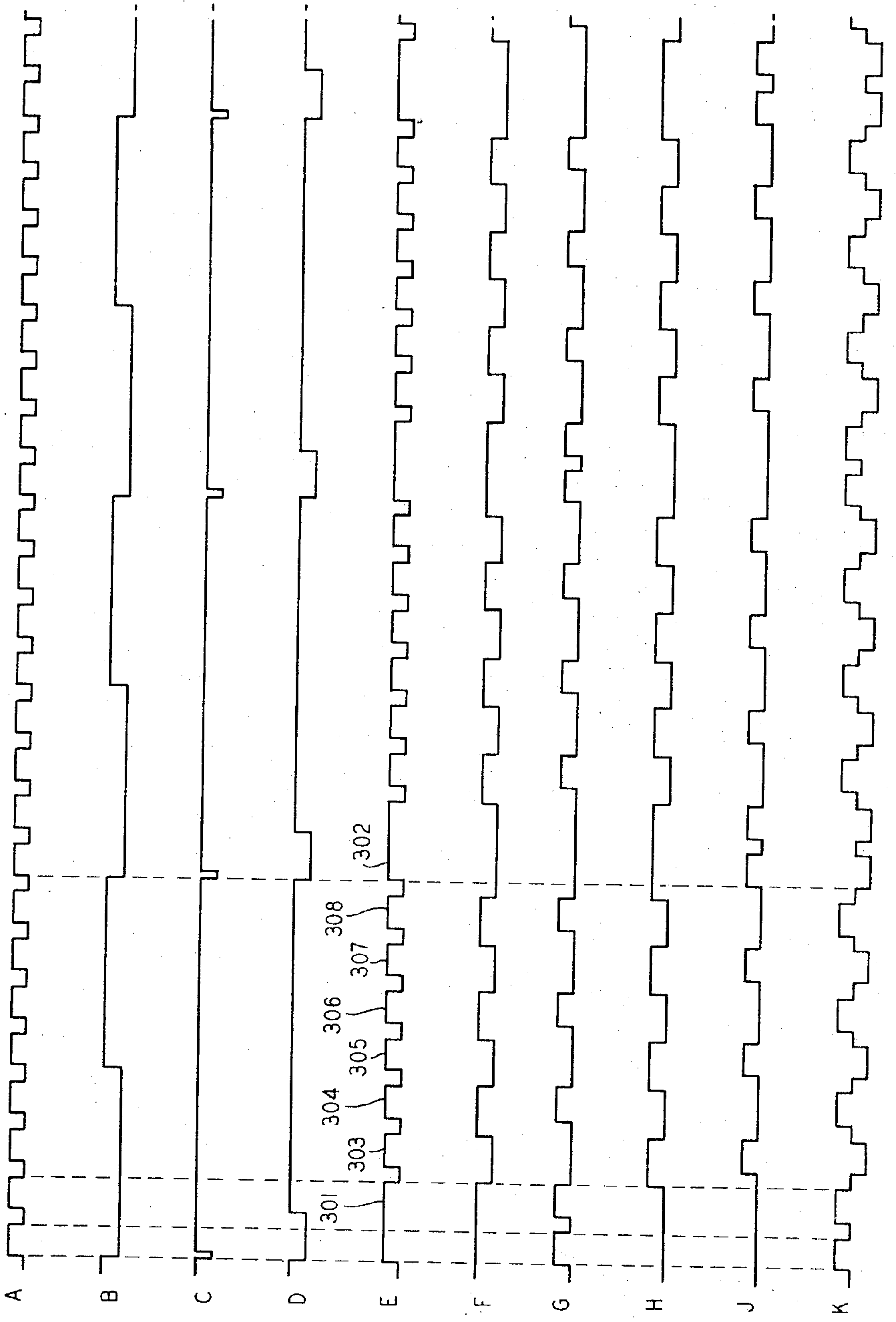
FIG. 3 depicts the output waveforms of the several circuits which form the composite clock signal generating circuit.

The "divide by 64" counter 104 divides down the 512 kHz wave, producing at its output an 8 kHz square wave, shown as timing wave B in FIG. 3. The 8 kHz wave is applied to a third input of bipolar violation control logic 106 and comprises the other one of the clock signals having a repetition rate which is an even submultiple of the repetition rate of the 64 kHz wave. The circuitry shown in FIG. 1 is arranged to superimpose the 8 kHz wave on the 64 kHz wave and, more specifically, to translate the 64 kHz wave to a bipolar pulse train and to violate each eighth bipolar pulse to define the 8 kHz wave superimposed thereon. As will be seen, successive ones of the violations alternate in polarity and, with the wave applied to a balanced and floating line pair, the composite signal has no dc component and is polarity insensitive.

Bipolar violation control logic 106 provides the logic function of defining which pulse of the 64 kHz wave will be the bipolar violation. More specifically, bipolar violation control logic 106 responds to the 64 kHz wave output of "divide by 8" counter 105, the 8 kHz wave output of "divide by 64" counter 104 and the 512 kHz wave output of timing supply 101 to locate each eighth pulse of the 64 kHz wave which occurs concurrently with each transition defining the initiation of a cycle of the 8 kHz wave. The resulting output of bipolar violation control logic circuit 106 is shown as signal wave E in FIG. 3. Elongated pulses in the wave, such as pulses 301 and 302, identify the 64 kHz bipolar pulses to be violated. Wave E is applied to another input of bipolar switch 114.

Bipolar switch 114 is controlled by wave E to define the ultimate polarity of each pulse of wave A. The output of bipolar switch 114 is applied to a rail pair, one rail defining pulses of one polarity and the other rail defining pulses of the opposite polarity. More particularly, alternate ones of the pulses of wave E direct the pulses of wave A to one output rail, such as rail G, whose waveform is depicted as wave G in FIG. 3. The other ones of the pulses of wave E direct the pulses of wave A to rail J, whose waveform is depicted as wave J in FIG. 3. Referring to wave E, and starting with elongated pulse 301, it is seen that the two pulses of wave A generated during the pulse 301 interval are passed to rail G. The next pulse of wave E is pulse 303 and the pulse of wave A generated during the pulse 303 interval is passed to rail J. Similarly, the next five pulses of wave E; namely, pulses 304 through 308, control bipolar switch 114 to alternately pass the pulses of wave A to rails G and J.

Elongated pulse 302 follows pulse 308. Pulse 302 controls bipolar switch 114 to pass two pulses of wave A to output rail J. Thus, successive pulses of wave A are passed to alternate rails with the exception that this sequence is violated during each prolonged pulse interval of wave E wherein two successive pulses of wave A are passed to the same rail. Since the rate of wave B is an eighth of the rate of wave A, the violation occurs for each eighth pulse of wave A and the pulse pairs are therefore passed to one rail for one prolonged interval and then to the other rail for the next successive prolonged interval.

The signal waves on rails G and J from bipolar switch 114 are applied to inputs of line driver 118. Line driver 118 combines the signal waves on the two rails, then transformer-couples them to line 122, which constitutes a balanced, floating pair. Line 122 then extends to various terminating circuits, one of the circuits being identified as terminating circuit 201 in FIG. 2. The signal wave on line 122 as seen across its pair of leads is shown as waveform K in FIG. 3. Examining wave K, it is seen that each positive pulse therein is derived from wave G and each negative pulse is derived from wave J. Starting on the left, the first two pulses constitute a violation and are positive, the next six pulses alternate in polarity, the next two pulses constitute a violation and are negative, et cetera. Thus, each series of 16 pulses has an equal number (8) of positive and negative pulses, the wave therefore having a zero dc component, and each eighth ones of the pulses violate the alternate rule.

Bipolar violation control logic 106 comprises a plurality of logic circuits comprising flip-flops 107 and 109, inverter 110 and gates 108 and 111. Assuming flip-flop 107 is in its normal CLEAR condition, the next following negative transition of the eight kHz wave (waveform B) toggles flip-flop 107 to the SET condition. The "0" output of flip-flop 107, which is depicted as wave C in FIG. 3, goes negative. At the same time the "1" output of flip-flop 107 enables gate 108. The next subsequent positive transition of the 512 kHz wave output of timing supply 101 passes through gate 108 and clears flip-flop 107, terminating the negative output. The "0" output of flip-flop 107 restores to its normal condition and this condition is maintained until the next negative transition of the 8 kHz wave.

Output wave C of flip-flop 107 is applied to the CLEAR input of flip-flop 109. Flip-flop 109, which is normally SET, is cleared by the negative transition of wave C. Output terminal "1" of flip-flop 109 thereupon goes negative, as depicted by waveform D in FIG. 3. The next subsequent positive transition of the 64 kHz signal wave (waveform A) is converted to a negative transition by inverter 110 to set flip-flop 109. Output terminal "1" of flip-flop 109 restores to its relatively positive condition, as seen in waveform D. Flip-flop 109 is maintained SET until the next negative transition of signal wave C.

The output of inverter 110 and signal wave D are applied to gate 111. During the interval that flip-flop 109 is SET, signal wave D is high to enable gate 111 and the 64 kHz wave output of inverter 110 is passed through the gate. During the interval that flip-flop 109 is CLEAR, however, signal wave D is low and gate 111 is blocked. As a consequence the output of gate 111, which is shown as signal wave E, is high for two consecutive pulse periods of signal wave A. The two consecutive pulse periods define the transition of the eight kHz wave, thus defining the bipolar violation, as previously described.

The logic circuits in bipolar switch 114 constitute flip-flop 115 and gates 116 and 117. The wave E output of bipolar violation control logic 106 is passed to the TOGGLE input of flip-flop 115. Flip-flop 115 is therefore alternately toggled to its SET and CLEAR conditions by the negative transitions of signal wave E. The consequent wave outputs on the "1" and "0" terminals of flip-flop 115 are shown as waveforms F and H, respectively, in FIG. 3. The signal waves F and H are applied to gates 116 and 117, respectively, to alternately enable the gates. As a consequence, the 64 kHz wave A is alternately passed through gates 116 and 117 under control of signal waves F and H. As seen in FIG. 1, with signal wave F high, pulses of the 64 kHz wave are passed to rail G by way of gate 116. Alternatively, when signal wave H is high the pulses of the 64 kHz wave are passed by way of gate 117 to signal rail J. As a consequence, the 64 kHz wave is passed to first one and then the other of rails G and J, as directed by successive ones of the pulses of signal wave E.

The waves on rails G and J are applied to the bases of transistors 119 and 120, respectively, in line driver 118. The outputs of transistors 119 and 120 are applied, in opposition, to the primary winding of pulse transformer 121. As a consequence, the outputs of these transistors are combined, in opposition; the output of one transistor developing a pulse opposing in polarity the pulse developed by the other transistor. These combined pulses, shown as waveform K, are transformer-coupled by way of the secondary winding of transformer 121 to line 122.

Figure 2:
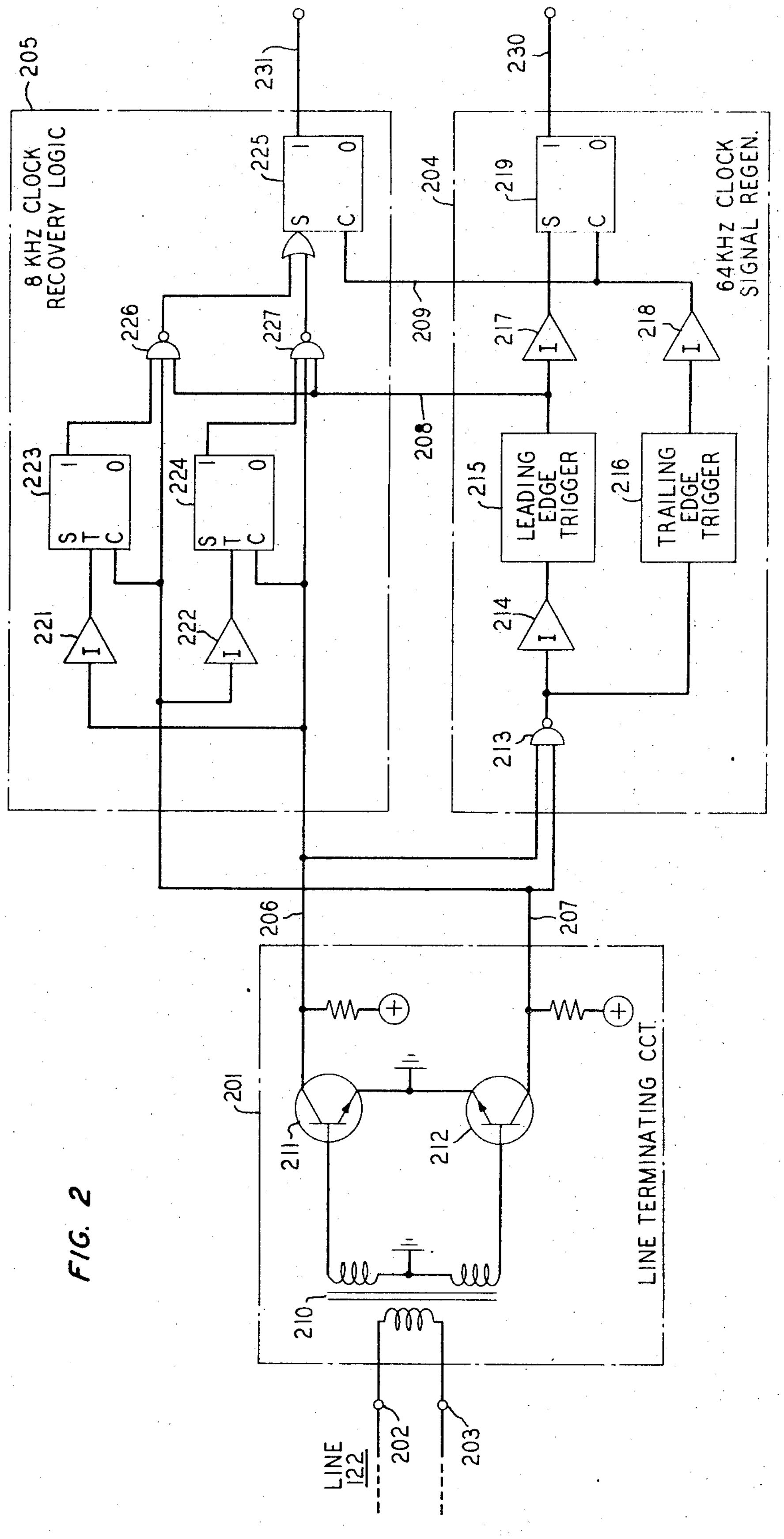

It was previously noted that line 122 extends to various terminating circuits, such as line terminating circuit 201 shown in FIG. 2. More specifically, the leads of line 122 are connected to terminals 202 and 203 of line terminating circuit 201. Line terminating circuit 201 provides the termination for line 122, transformer-coupling the signals on line 122 therethrough and applying pulses of one polarity to output lead 206 and pulses of the other polarity to output lead 207.

The waveform on lead 206 constitutes a negative pulse for each pulse of one polarity on line 122, the waveform having the appearance of the inverse of the waveform on one of the output rails of bipolar switch 114. The waveform on lead 206 might therefore comprise, for example, the inverse of waveform G in FIG. 3; a train of negative pulses corresponding to the train of positive pulses in waveform G. The waveform on lead 207 similarly defines a series of negative pulses; corresponding to pulses of the other polarity on line 122. This train of negative pulses would therefore have the appearance of the inverse of the positive train of pulses in waveform J.

The waveforms on leads 206 and 207 are applied to 8 kHz clock recovery logic 205 and to 64 kHz clock signal regenerator 204. Clock signal regenerator 204 combines the waveforms on leads 206 and 207 into a positive pulse train which assumes the same form as signal wave A. This waveform is passed to output lead 230. One function of clock signal regenerator 204 is therefore to recover the 64 kHz clock signal. Another function of clock signal regenerator 204 is to define the leading edge and the trailing edge of each of the 64 kHz clock pulses. A trigger pulse is applied to output lead 208 corresponding to the leading edge and a trigger pulse is applied to output lead 209 corresponding to the trailing edge of each of the 64 kHz clock pulses. The trigger pulses on leads 208 and 209 are applied to 8 kHz clock recovery logic 205.

In general, the function of 8 kHz clock recovery logic 205 is to recover the leading edge of each of the 8 kHz clock signals superimposed on the 64 kHz clock signal. As described in detail hereinafter, recovery logic 205 determines the leading edges of the 8 kHz wave from the bipolar violations in the waveforms on leads 206 and 207. When recovery logic 205 detects a bipolar violation; namely, two adjacent pulses on either one of leads 206 or 207, the leading edge of a pulse is generated and applied to output lead 231 under control of the leading edge trigger pulse on lead 208. The trailing edge trigger pulse on lead 209 thereafter terminates the pulse on lead 231. Accordingly, for each bipolar violation (defining the leading edge of each 8 kHz clock signal), a pulse is applied to lead 231, the leading and trailing edges of the pulse being determined by the trigger pulses on leads 208 and 209, respectively, so that each pulse has the same duration as the 64 kHz clock pulse on lead 230.

Line terminating circuit 201 includes pulse transformer 210 and transistors 211 and 212. The primary winding of transformer 210 is connected to terminals 202 and 203. The pulses on line 122 are, therefore, transformer-coupled through transformer 210 to the bases of transistors 211 and 212. Accordingly, positive pulses applied to terminal 202 turn ON transistor 211 to therefore pass negative pulses to lead 206. Similarly, negative pulses applied to terminal 202 (and therefore positive pulses applied to terminal 203) turn ON transistor 212 to apply negative pulses to lead 207. In the event that the pair of leads of line 122 is interchanged with respect to terminals 202 and 203, the train of pulses previously applied to lead 206 would be applied to lead 207 and, conversely, the train of pulses previously applied to lead 207 would be applied to lead 206. Since, as previously described, the 64 kHz clock is recovered by combining these pulses and the 8 kHz clock transitions are identified by recognizing bipolar pulse violations regardless of their polarity, it is apparent that the leads of line 122 can be connected to terminals 202 and 203 in the manner shown in FIG. 2 or can be reversed and the 64 kHz clock signal and the 8 kHz clock transition will, in either event, be recovered.

64 kHz clock signal regenerator 204 includes therein gate 213, inverters 214, 217 and 218, triggers 215 and 216 and flip-flop 219. Gate 213 combines the pulse waves on leads 206 and 207 and applies them by way of inverter 214 to leading edge trigger 215 and, in addition, applies them directly to trailing edge trigger 216. The output of leading edge trigger 215 constitutes a momentary pulse in response to the leading edge of each pulse, positive or negative, on line 122. This momentary pulse is passed to output lead 208 and, in addition, is passed by inverter 217 to set flip-flop 219. The "1" terminal output of flip-flop 219 is connected to lead 230 and the signal condition on lead 230 thereupon goes high when flip-flop 219 is set.

Trailing edge trigger 216 provides a momentary pulse to its output, defining the trailing edge of each pulse, positive or negative, on line 122. This pulse is passed by inverter 218 to output lead 209 and to the CLEAR input of flip-flop 219. Flip-flop 219 is cleared by the trailing edge of the 64 kHz clock pulse and the signal condition on lead 230 is restored to its normal condition. Lead 230 therefore provides a pulse train corresponding to 64 kHz clock signal waveform A.

8 kHz clock recovery logic 205 includes inverters 221 and 222, gates 226 and 227 and flip-flops 223, 224 and 225. Each negative pulse on leads 206 and 207 is passed through inverters 221 and 222 to toggle flip-flops 223 and 224. Considering first flip-flop 223, this flip-flop is normally in the CLEAR condition. Upon the appearance of the trailing edge of the pulse on lead 206, flip-flop 223 is toggled to the SET condition. Thereafter, the negative transition leading edge of the next subsequent pulse on lead 207 clears flip-flop 223. So long as the pulse train on line 122 follows the bipolar format of alternate polarity pulses, flip-flop 223 continues to be toggled to the SET condition by the trailing edge of the pulse on lead 206 and cleared by the leading edge of the pulse on lead 207. If a violation occurs, however, wherein two successive pulses are applied to lead 206, flip-flop 223 is set, as previously described, by the trailing edge of the first pulse. The flip-flop is not cleared, however, until toggled by the trailing edge of the next subsequent pulse on lead 206. During this interval, gate 226 is enabled by the high condition on the "1" terminal output of flip-flop 223 and the high condition on lead 207, the latter high condition resulting from the lack of a negative pulse on lead 207 due to the bipolar violation. Accordingly, when the trigger pulse defining the leading edge of the second pulse on lead 206 is applied to lead 208 this momentary pulse is passed through gate 226 to set flip-flop 225. The signal condition on the "1" terminal of flip-flop 225 goes high and this condition is passed to lead 231. A trailing edge trigger pulse is then applied to lead 209 to clear flip-flop 225 and to terminate the pulse on lead 231.

Flip-flop 224 is toggled to the SET condition in response to the trailing edge of each pulse on lead 207 and cleared by the leading edge of the subsequent pulse on lead 206 so long as the pulse train does not have a bipolar violation, and two successive pulses are not applied to lead 207. In the event, however, that a bipolar violation occurs and two successive pulses are applied to lead 207, then flip-flop 224 is toggled to the SET condition by the trailing edge of the first pulse and is not returned to the CLEAR condition until the second pulse terminates. Gate 227 is therefore enabled by the high condition on the "1" output terminal of flip-flop 224 and the high condition on lead 206. The trigger pulse on lead 208 is therefore passed through gate 227 to set flip-flop 225. The high condition at the "1" output terminal of flip-flop 225 is therefore applied to lead 231, as previously described, the pulse on lead 231 terminating in response to the trailing edge trigger pulse on lead 209. It is, therefore, seen that the negative transition of the 8 kHz clock is recovered on lead 231 in response to bipolar violations of two successive positive pulses or negative pulses passed to either lead 206 or lead 207.

Although a specific embodiment of this invention has been shown and described, it will be understood that various modifications may be made without departing from the spirit of this invention.

We claim:

1. A system for distributing clock signals by way of a distribution line comprising,
   - a source of clock signals including means for producing a first train of clock pulses and for producing a second train of clock pulses having a repetition rate which is an even submultiple of the pulse repetition rate of the first train,
   - means for applying a pulse to the line in response to each pulse of the first train, the applying means being normally arranged to reverse the polarity of successive ones of the applied pulses and being further arranged to maintain the polarity of one of the applied pulses the same as the polarity of the preceding pulse in response to each pulse of the second train, and
   - a plurality of pulse-responsive circuits connected to the line, each of the pulse-responsive circuits including means responsive to the pulses applied to the line for recovering the first train of pulses and means responsive to each pulse applied to the line having the same polarity as the preceding pulse for identifying the pulses of the second train.

2. A system, in accordance with claim 1, wherein the distribution line comprises a balanced pair of leads.

3. A system, in accordance with claim 2, wherein the balanced pair of leads is floating.

4. A system, in accordance with claim 3, wherein the leads of the balanced pair are interconnected by a winding of a pulse transformer and the output of the applying means is connected to another winding of the pulse transformer.

5. A system, in accordance with claim 4, wherein the applying means includes a pair of pulse generators and the outputs of the pulse generators are coupled, in opposition, across the other winding of the pulse transformer.

6. A system, in accordance with claim 5, wherein the applying means further includes a pair of gates, each gate connected to one of the pulse generators and arranged, when enabled, to pass a pulse in the first train therethrough to operate the pulse generator connected thereto, and means responsive to the pulses in the first train for normally alternately enabling the gates.

7. A system, in accordance with claim 6, wherein the applying means also includes means responsive to each pulse of the second train for maintaining enabled the concurrently enabled one of the gates for one additional pulse period of the first train, whereby two successive pulses of the first train operate the same pulse generator.

8. A method of superimposing a first clock pulse signal on a second clock pulse signal, the first clock signal having a pulse repetition rate which is an even submultiple of the pulse repetition rate of the second clock signal, and distributing the composite signal to a plurality of pulse-responsive circuits, comprising the steps of:
   - normally generating successive pulses of opposite polarity in response to pulses of the second clock signal,
   - interrupting the generation of one of the successive pulses and generating, in place thereof, a pulse having the same polarity as the preceding generated pulse in response to each pulse of the first clock signal, and
   - applying the generated pulses across a balanced line pair which extends to the plurality of pulse-responsive circuits.

* * * * *